US009787403B2

(12) United States Patent
Abe

(10) Patent No.: US 9,787,403 B2
(45) Date of Patent: Oct. 10, 2017

(54) DIGITAL OPTICAL TRANSMITTER, OPTICAL COMMUNICATION SYSTEM USING THE SAME, AND DIGITAL OPTICAL TRANSMISSION METHOD

(71) Applicant: NEC Corporation, Minato-ku, Tokyo (JP)

(72) Inventor: Junichi Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 20 days.

(21) Appl. No.: 14/778,208

(22) PCT Filed: Feb. 14, 2014

(86) PCT No.: PCT/JP2014/000760
§ 371 (c)(1),
(2) Date: Sep. 18, 2015

(87) PCT Pub. No.: WO2014/162649
PCT Pub. Date: Oct. 9, 2014

(65) Prior Publication Data
US 2016/0285558 A1 Sep. 29, 2016

(30) Foreign Application Priority Data

Apr. 4, 2013 (JP) .................................. 2013-078448

(51) Int. Cl.
*H04B 10/04* (2006.01)
*H04B 10/12* (2006.01)
(Continued)

(52) U.S. Cl.
CPC ......... *H04B 10/508* (2013.01); *G02F 1/0123* (2013.01); *H04B 10/516* (2013.01);
(Continued)

(58) Field of Classification Search
CPC .. H04B 10/508; H04B 10/516; H04B 10/588; H04B 10/505; G02F 1/0123; G02F 2001/212; H04L 25/03343
(Continued)

(56) References Cited

U.S. PATENT DOCUMENTS

| 6,885,241 | B2 * | 4/2005 | Huang | .................. H03F 1/3247 |
| | | | | 330/149 |
| 7,023,601 | B2 * | 4/2006 | McGhan | ................ G02F 1/225 |
| | | | | 359/246 |

(Continued)

FOREIGN PATENT DOCUMENTS

| EP | 2464038 A1 | 6/2012 |
| JP | 2009-171634 A | 7/2009 |

(Continued)

OTHER PUBLICATIONS

Oda, Shoichiro et al., "80×224 Gb/s Unrepeated Transmission over 240 km of Large-Aeff Pure Silica Fibre without Remote Optical Pre-amplifier", ECOC 2011 Postdeadline Papers, Sep. 2011. English Abstract.

(Continued)

*Primary Examiner* — M. R. Sedighian
*Assistant Examiner* — Abbas H Alagheband

(57) ABSTRACT

A digital optical transmitter of the present invention comprises an optical modulator, pre-equalization factor computation means for generating transform functions for compensating waveform distortion to occur in the optical modulator, and pre-equalization signal generation means for outputting third data and fourth data after creating them by performing a pre-equalization process on first data and second data. Here, through the transform functions, the first data is added to the fourth data, in a manner depending on a characteristic of the optical modulator, and the second data (Continued)

is added to the third data, in a manner depending on a characteristic of the optical modulator.

12 Claims, 19 Drawing Sheets

(51) Int. Cl.
H04B 10/508 (2013.01)
G02F 1/01 (2006.01)
H04B 10/588 (2013.01)
H04B 10/516 (2013.01)
H04L 25/03 (2006.01)
G02F 1/21 (2006.01)

(52) U.S. Cl.
CPC ..... *H04B 10/588* (2013.01); *H04L 25/03343* (2013.01); *G02F 2001/212* (2013.01)

(58) Field of Classification Search
USPC .......................................................... 398/183
See application file for complete search history.

(56) References Cited

U.S. PATENT DOCUMENTS

| | | | | |
|---|---|---|---|---|
| 7,382,984 B2* | 6/2008 | McNicol | .......... | H04B 10/25137 398/147 |
| 7,382,985 B2* | 6/2008 | Roberts | ............ | H04B 10/25137 398/147 |
| 7,558,479 B1* | 7/2009 | Robinson | ........... | H04B 10/0795 398/13 |
| 7,630,650 B2* | 12/2009 | Hoshida | ............. | H04B 10/6971 398/149 |
| 7,756,421 B2* | 7/2010 | Roberts | .............. | H04B 10/2543 398/158 |
| 8,437,645 B2* | 5/2013 | Boffi | ...................... | H04B 10/61 398/152 |
| 8,526,828 B2* | 9/2013 | Nakashima | .......... | H04B 10/572 398/185 |
| 9,001,880 B2* | 4/2015 | Herrmann | ................ | H04B 3/32 375/229 |
| 2001/0050592 A1* | 12/2001 | Wright | .................. | H03F 1/3241 330/2 |
| 2003/0184374 A1* | 10/2003 | Huang | .................. | H03F 1/3247 330/149 |
| 2004/0161249 A1 | 8/2004 | Suda et al. | | |
| 2005/0007642 A1* | 1/2005 | McGhan | .................. | G02F 1/225 359/237 |
| 2005/0069050 A1* | 3/2005 | Ding | ........................ | H03C 3/40 375/296 |
| 2005/0180682 A1* | 8/2005 | Griffin | ............. | H04B 10/25137 385/16 |
| 2009/0028279 A1* | 1/2009 | Kitta | ..................... | H04L 7/0334 375/371 |
| 2010/0130143 A1* | 5/2010 | Collados Asensio | . | H04L 27/361 455/102 |
| 2010/0189443 A1* | 7/2010 | Krause | ............... | H04B 10/5055 398/115 |
| 2012/0141130 A1* | 6/2012 | Nakashima | .......... | H04B 10/572 398/82 |
| 2012/0281746 A1* | 11/2012 | Herrmann | ................ | H04B 3/32 375/229 |
| 2013/0209089 A1* | 8/2013 | Harley | ............... | H04B 10/5561 398/25 |
| 2013/0216239 A1* | 8/2013 | Zhang | .................. | H04B 10/613 398/202 |

FOREIGN PATENT DOCUMENTS

| | | |
|---|---|---|
| JP | 2012-120010 A | 6/2012 |
| JP | 2012-129606 A | 7/2012 |
| WO | 2010/082578 A1 | 7/2010 |
| WO | 2012/108421 A | 8/2012 |

OTHER PUBLICATIONS

International Search Report for PCT Application No. PCT/JP2014/000760, mailed on Apr. 1, 2014.
English translation of Written opinion for PCT Application No. PCT/JP2014/000760.
"Computationally efficient methods for blind decision feedback equalization of QAM signals", AEU International Journal of Electronics and Communications, Elsevier, Jena, DE, vol. 62, No. 5, May 5, 2008, pp. 374-385, XP022587600.
Extended European Search Report for EP Application No. EP14780356.3 dated on Nov. 16, 2016.

* cited by examiner

# DIGITAL OPTICAL TRANSMITTER, OPTICAL COMMUNICATION SYSTEM USING THE SAME, AND DIGITAL OPTICAL TRANSMISSION METHOD

This application is a National Stage Entry of PCT/JP2014/000760 filed on Feb. 14, 2014, which claims priority from Japanese Patent Application 2013-078448 filed on Apr. 4, 2013, the contents of all of which are incorporated herein by reference, in their entirety.

TECHNICAL FIELD

The present invention relates to a digital optical transmitter, an optical communication system using the transmitter and a digital optical transmission method, and in particular, relates to a digital optical transmitter comprising a Mach-Zehnder type optical modulator, and to an optical communication system and a digital optical transmission method both using the transmitter.

BACKGROUND ART

In association with explosive increase in demand for broadband multimedia communication services such as the internet and video delivery, introduction of long-haul, large-capacity and high-reliability fiber optic communication systems has been advanced. In fiber optic communication systems, it is important to reduce the construction cost of optical fibers to become the transmission lines, and to increase the efficiency of transmission band utilization per one optical fiber. Accordingly, the importance of digital coherent optical communication technology using a digital optical transmitter/receiver has been increasing.

In digital coherent optical communication, waveform distortion, such as wavelength dispersion, is compensated by performing digital signal processing (DSP) at a sending side or a receiving side. As a result, digital coherent optical communication can perform such compensation with higher accuracy, compared to analog optical transmitters/receivers using modulation methods such as OOK (on-off keying), which are generally employed in large-capacity optical communication systems. Therefore, digital coherent optical communication enables to realize performance improvement and cost reduction of communication devices. Examples of optical communication devices employed in digital coherent light communication are disclosed in Patent Literature 1 and Patent Literature 2.

FIG. 19 shows a block configuration diagram of a general optical transmitter employed in digital coherent optical communication. Being different from binary data modulation performed in analog transmitters, modulation performed in the digital optical transmitter of FIG. 19 is such as multi-level modulation using QPSK (quadrature phase shift keying), QAM (quadrature amplitude modulation) or the like, or arbitrary waveform modulation using output of a D/A (digital to analog) converter in order to perform pre-equalization or the like.

In such a digital optical transmitter, a Mach-Zehnder (hereinafter, referred to as MZ) type optical modulator is generally used. An MZ type optical modulator is formed by installing optical-waveguide type optical phase modulators into an optical-waveguide type MZ type interferometer. In such an MZ type optical modulator, various kinds of optical modulation including intensity modulation and phase modulation are performed by adjusting the applied voltage and the interferometer configuration.

CITATION LIST

Patent Literature

[Patent Literature 1] Japanese Patent Application Laid-Open No. 2009-171634
[Patent Literature 2] PCT International Publication No. WO 2012/108421

SUMMARY OF INVENTION

Technical Problem

However, in the above-described digital optical transmitter employing an MZ type optical modulator, when multi-level modulation signals of QAM or the like or pre-equalization signals using a complicated transmit waveform are used, there occurs distortion of a transmit waveform due to imperfection in the interferometer constituting the MZ type optical modulator. In that case, as a consequence, the reception characteristic of the system is deteriorated.

The present invention has been made in view of the above-described problem, and accordingly, its objective is to provide a digital optical transmitter capable of making the quality of outputted transmit signals kept preferable and maintaining the system performance, even when waveform distortion is imposed in an optical modulator comprised there, and also to provide an optical communication system using the digital optical transmitter and a digital optical transmission method having the same capability.

Solution to Problem

In order to achieve the above-described objective, a digital optical transmitter according to the present invention is characterized by that it comprises: pre-equalization factor calculation means for generating transform functions; pre-equalization signal generation means for generating third data and fourth data from first data and second data, by the use of the generated transform functions; and an optical modulator comprising a splitting unit for splitting an optical signal into two, a first optical modulator unit for performing optical modulation of one of the split optical signals on the basis of the third data, a second optical modulator unit for performing optical modulation of the other one of the split optical signals on the basis of the fourth data, and a combining unit for combining the two optical signals having received the optical modulations and outputting the combined optical signal, wherein the transform functions are functions for adding, respectively, the first data to the fourth data and the second data to the third data, in a manner to compensate waveform distortion to occur in the optical modulator.

In order to achieve the above-described objective, an optical communication system according to the present invention is characterized by its employing the above-described digital optical transmitter.

In order to achieve the above-described objective, a digital optical transmission method according to the present invention is characterized by that: it is a digital optical transmission method using an optical modulator comprising a splitting unit for splitting an optical signal into two, a first optical modulator unit for performing optical modulation of one of the split optical signals on the basis of third data, a second optical modulator unit for performing optical modulation of the other one of the split optical signals on the basis of fourth data, and a combining unit for combining the two optical signals having received the optical modulations and outputting the combined optical signal; it comprises generating transform functions for compensating signal distortion to occur in the optical modulator, and generating the third data and the fourth data from first data and second data by the use of the generated transform functions; and the transform functions are functions for adding, respectively, the first data to the fourth data and the second data to the third data, in a manner to compensate waveform distortion to occur in the optical modulator.

Advantageous Effects of Invention

According to the above-described aspects of the present invention, even when waveform distortion is imposed in the optical modulator, the quality of outputted transmit signals can be kept preferable, and the system performance can be maintained.

DESCRIPTION OF EMBODIMENTS (first exemplary embodiment)

Figure 1:
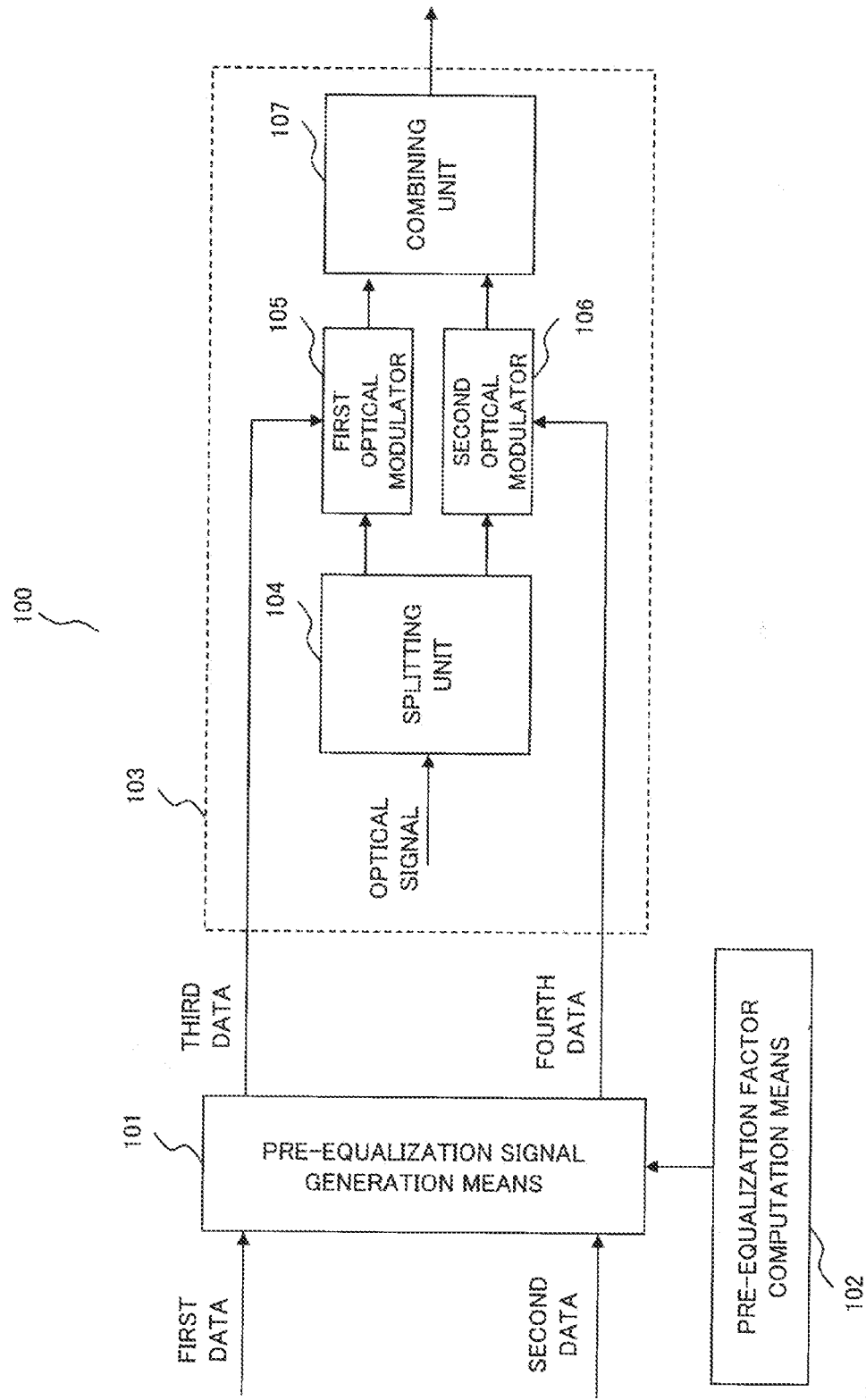
FIG. 1 a block configuration diagram of a digital optical transmitter/receiver 100 according to a first exemplary embodiment FIG. 2 a block configuration diagram of a digital optical transmitter/receiver 200 according to a second exemplary embodiment FIG. 3 a block configuration diagram of a front signal processing unit 204 according to the second exemplary embodiment FIG. 4 a block configuration diagram of a pre-equalization signal generation unit 202 and a pre-equalization factor computation unit 203, according to the second exemplary embodiment FIG. 5 a diagram for explaining a characteristic of an MZ type I-Q optical modulator 209 according to the second exemplary embodiment FIG. 6A optical signals $E_+$ and $E_-$ outputted from the MZ type I-Q optical modulator 209 according to the second exemplary embodiment FIG. 6B $E_{out}=E_++E_-$ when the optical signals $E_+$ and $E_-$ are outputted from the MZ type I-Q optical modulator 209 according to the second exemplary embodiment FIG. 7 a diagram for explaining a characteristic of the MZ type I-Q optical modulator 209 according to the second exemplary embodiment FIG. 8 a diagram showing an example of linear approximation of a characteristic of an optical signal outputted from the MZ type I-Q optical modulator 209 according to the second exemplary embodiment FIG. 9 an example of filter functions $f_1$ to $f_4$ of a pre-equalization signal generation unit 202 according to the second exemplary embodiment FIG. 10A another set of optical signals $E_+$ and $E_-$ outputted from the MZ type I-Q optical modulator 209 according to the second exemplary embodiment FIG. 10B $E_{out}=E_++E_-$ when the optical signals $E_+$ and $E_-$ in FIG. 10A are outputted from the MZ type I-Q optical modulator 209 according to the second exemplary embodiment FIG. 11 a diagram showing an example of approximation of a characteristic of an optical signal outputted from the MZ type I-Q optical modulator 209 according to the second exemplary embodiment FIG. 12 an example of filter functions $f_1$ to $f_4$ of the pre-equalization signal generation unit 202 according to the second exemplary embodiment FIG. 13A an example of filter functions $f_1$ to $f_4$ of the pre-equalization signal generation unit 202 according to the second exemplary embodiment FIG. 13B another example of filter functions $f_1$ to $f_4$ of the pre-equalization signal generation unit 202 according to the second exemplary embodiment FIG. 14 a diagram for explaining a computation method of filter functions $f_1$ to $f_4$ of a pre-equalization factor computation unit 203 according to a modified example of the second exemplary embodiment FIG. 15 a diagram for explaining a computation method of filter functions $f_1$ to $f_4$ of the pre-equalization factor computation unit 203 according to the modified example of the second exemplary embodiment FIG. 16 a block configuration diagram of a digital optical transmitter/receiver 1600 according to a third exemplary embodiment FIG. 17 a block configuration diagram of a digital optical transmitter/receiver 1700 according to a fourth exemplary embodiment FIG. 18 a block configuration diagram of a digital optical transmitter/receiver 1800 according to a fifth exemplary embodiment FIG. 19 a block configuration diagram of a general digital optical transmitter/receiver

A first exemplary embodiment of the present invention will be described below. FIG. 1 shows a block configuration diagram of an optical transmitter/receiver according to the present exemplary embodiment. In FIG. 1, a digital optical transmitter 100 comprises a pre-equalization signal generation means 101, a pre-equalization factor computation means 102 and an optical modulator 103.

To the pre-equalization signal generation means 101, first data and second data, which are coded in a manner depending on a transmit signal modulation method, are inputted. The pre-equalization signal generation means 101 transforms the inputted first data and second data to third data and fourth data, respectively, using transform functions inputted from the pre-equalization factor computation means 102, and outputs the third data and fourth data to, respectively, a first optical modulator 105 and a second optical modulator 106 of the optical modulator 103. The pre-equalization signal generation means 101 according to the present exemplary embodiment performs the transform process described above by digital signal processing.

The pre-equalization factor computation means 102 computes transform factors depending on a transmission condition and outputs them to the pre-equalization signal generation means 101. As the transform factors, the pre-equalization factor computation means 102 according to the present exemplary embodiment computes pre-equalization factors for compensating waveform distortion to occur in the optical modulator 103. By the use of the transform factors, the pre-equalization signal generation means 101 generates the third data by adding the second data to the first data in a manner according to the extinction ratio and applied voltage of the optical modulator 103. Also by the use of the transform factors, the pre-equalization signal generation means 101 also generates the fourth data by adding the first data to the second data in a manner according to the extinction ratio and applied voltage of the optical modulator 103.

The optical modulator 103 generates and outputs transmit signals. As shown in FIG. 1, the optical modulator 103 consists of a splitting unit 104, the first optical modulator 105, the second optical modulator 106 and a combining unit 107.

The splitting unit 104 splits a carrier wave optical signal outputted from a light source, not illustrated in the diagram, into two, and outputs one of the split optical signals to the first optical modulator 105 and the other one to the second optical modulator 106. It is desirable to use continuous light for the carrier wave optical signal.

The first optical modulator 105 performs optical modulation of the one of the split optical signals inputted from the splitting unit 104 on the basis of the third data inputted from the pre-equalization signal generation unit 102, and outputs the modulated optical signal as a first optical signal. The second optical modulator 106 performs optical modulation of the other one of the split optical signals inputted from the splitting unit 104 on the basis of the fourth data inputted from the pre-equalization signal generation unit 102, and outputs the modulated optical signal as a second optical signal. In the present exemplary embodiment, the first optical signal is an optical signal of I-ch (in-phase channel), and the second optical signal is that of Q-ch (quadrature-channel).

The combining unit 107 combines the first optical signal inputted from the first optical modulator 105 with the second optical signal inputted from the second optical modulator 106, imposing a predetermined phase difference φ between them, and then outputs the combined optical signal as a transmit signal.

Here, to the transmit signal outputted from the optical modulator 103, waveform distortion specific to the optical modulator 103 is imposed. In the present exemplary embodiment, to the first optical modulator 105, the third data generated by adding the second data, in a manner depending on a characteristic of the optical modulator 103, to the first data is inputted from the pre-equalization signal generation unit 102. On the other hand, to the second optical modulator 106, the fourth data generated by adding the first data, in a manner depending on a characteristic of the optical modulator 103, to the second data is inputted from the pre-equalization signal generation unit 102.

Then, by driving the first modulator 105 and the second optical modulator 106 on the basis of, respectively, the third data and the fourth data described above, the waveform distortion specific to the optical modulator 103 is compensated, and accordingly, a transmit signal with its quality kept preferable is outputted.

Here, at a stage prior to the pre-equalization signal generation means 101, a coding unit for performing coding of transmit data in a manner depending on the transmit signal modulation method may be arranged. The coding performed by the coding unit embraces all coding processes performed in general transmitters, such as by framer processes, FEC (forward error correction) and a precoder, and is not limited to coding for a specific use.

(second exemplary embodiment)

Figure 2:
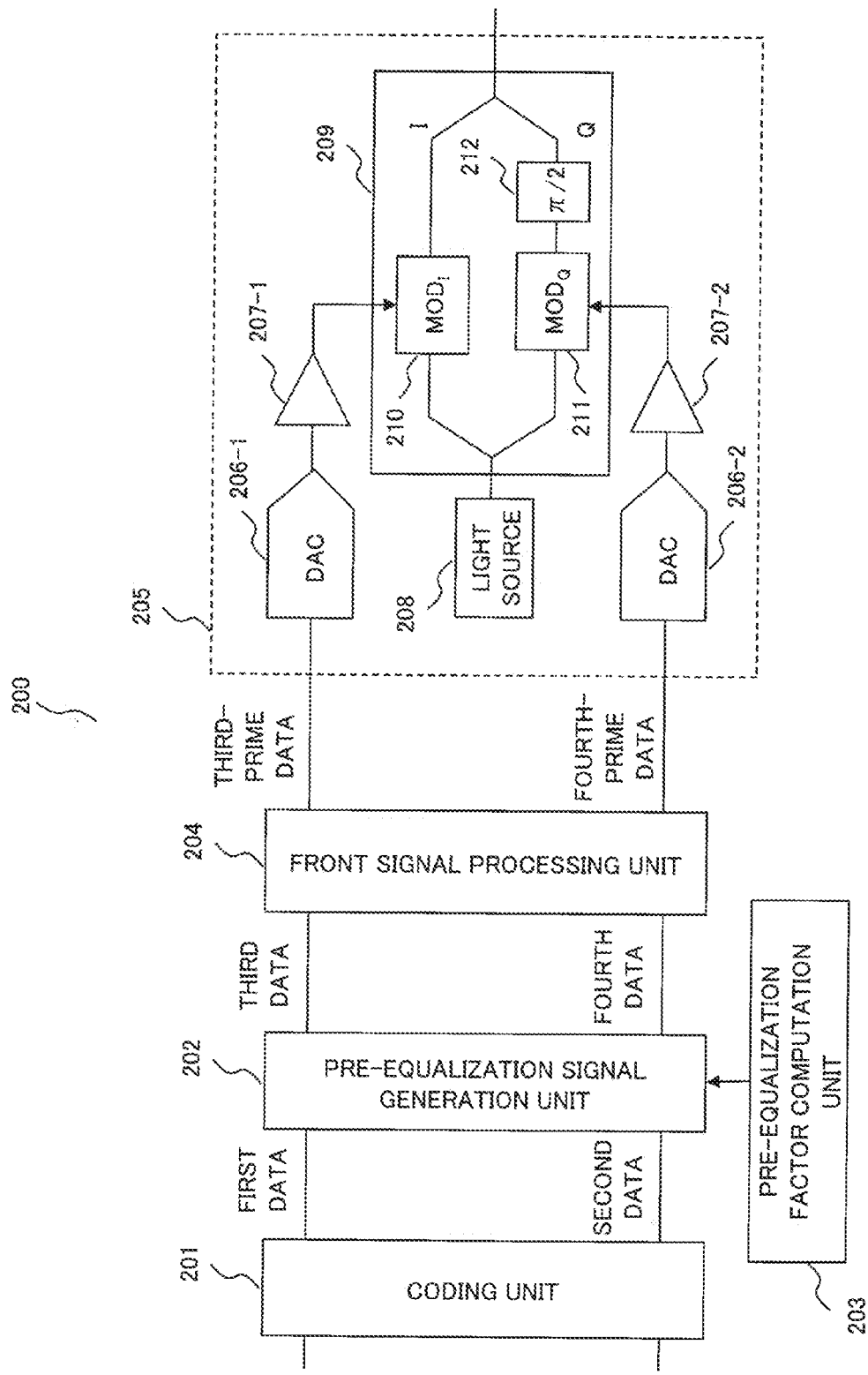

A second exemplary embodiment will be described below. FIG. 2 shows a block configuration diagram of an optical transmitter/receiver according to the present exemplary embodiment. A digital optical transmitter 200 according to the present exemplary embodiment comprises a coding unit 201, a pre-equalization signal generation unit 202, a pre-equalization factor computation unit 203, a front signal processing unit 204 and an optical modulation unit 205. As shown in FIG. 2, the optical modulation unit 205 consists of D/A converters (DACs: digital to analog converters) 206, driver amplifiers 207, a light source 208 and an MZ type I-Q optical modulator 209. More specifically, as shown also in FIG. 2, the MZ type I-Q optical modulator 209 consists of an optical modulator for I-ch 210, an optical modulator for Q-ch 211 and a π/2 phase shifter 212.

In FIG. 2, when there are two or more units provided with the same function, they are differentiated from each other by adding -1, -2 and the like to the same reference sign. In describing them, unless they need to be particularly distinguished from each other, for example, a "DAC 206-1", a "DAC 206-2" and the like are each described as a "DAC 206".

Transmit data is inputted to the coding unit 201. The coding unit 201 performs coding of the inputted transmit data in a manner depending on the transmit signal modulation method, and outputs the coded data to the pre-equalization signal generation unit 202, as first data and second data.

The pre-equalization signal generation unit 202 generates third data and fourth data from, respectively, the inputted first data and second data, on the basis of factor information from the pre-equalization factor computation unit 203, and outputs the generated data to the front signal processing unit 204.

The pre-equalization factor computation unit 203 computes factor information for compensating, in advance, waveform distortion to be imposed in the optical modulation unit 205, and outputs the factor information to the pre-equalization signal generation unit 202. Details of operation of the pre-equalization signal generation unit 202 and of the pre-equalization factor computation unit 203 will be described later.

The front signal processing unit 204 performs predetermined signal processing on the inputted two series of data, which are the third data and the fourth data, and outputs the two series of processed data to the optical modulation unit 205 as, respectively, third-prime data and fourth-prime data. The front signal processing unit 204 according to the present exemplary embodiment performs, on the third data and the fourth data, correction to linearize nonlinear characteristics of the front-end devices, including the DACs 206, the driver amplifiers 207, the optical modulator for I-ch 210 and the optical modulator for Q-ch 211, and signal processing for correcting their frequency characteristics.

Figure 3:
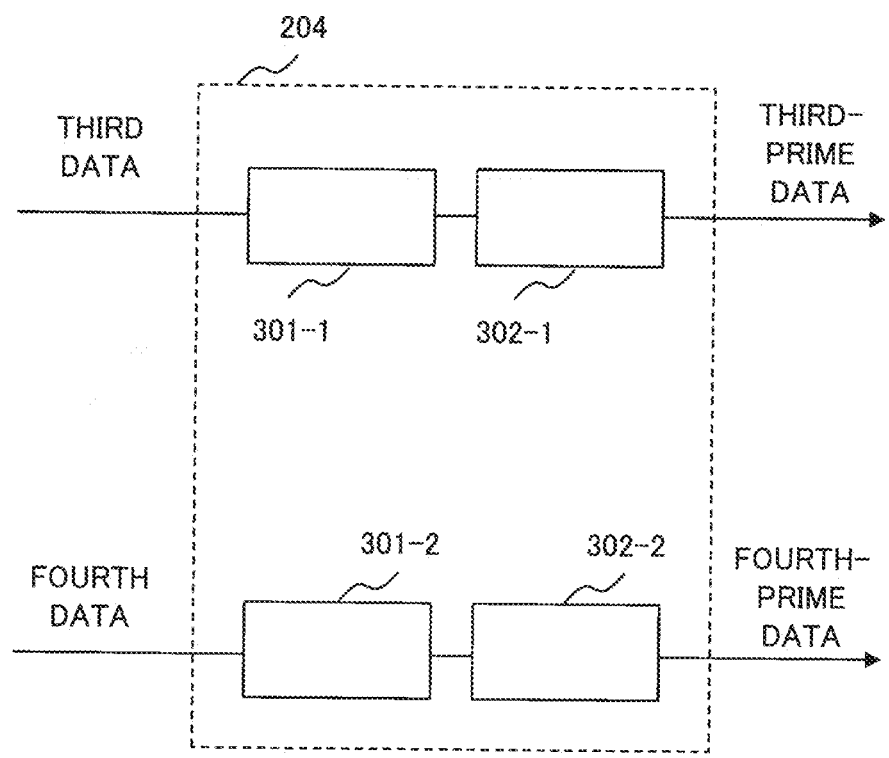

Here, the front signal processing unit 204 will be described in detail. An example of a block configuration diagram of the front signal processing unit 204 is shown in FIG. 3. The front signal processing unit 204 of FIG. 3 consists of linearizers 301-1 and 301-2, and band compensation filters 302-1 and 302-2. The third data inputted to the linearizer 301-1 is transformed into a data string for linearizing a nonlinear characteristic held by the optical modulation unit 205, which is then outputted to the band compensation filter 302-1. The data string inputted to the band compensation filter 302-1 is corrected into a data string (the third-prime data) for making a frequency characteristic held by the optical modulation unit 205 preferable, which is then outputted to the optical modulation unit 205.

On the other hand, the fourth data inputted to the linearizer 301-2 is transformed into a data string for linearizing the nonlinear characteristic held by the optical modulation unit 205. The transformed data string is further corrected, in the band compensation filter 302-2, into a data string (the fourth-prime data) for making the frequency characteristic held by the optical modulation unit 205 preferable, which is then outputted to the optical modulation unit 205.

As a result of comprising the front signal processing unit 204 as described above, the performance required of the optical modulators and the analog front end devices can be relaxed. Accordingly, it becomes possible for the digital optical transmitter 200 according to the present exemplary embodiment to improve the yield of the components to be used, and accordingly to reduce the cost.

Here, while FIG. 3 shows the configuration in which the front signal processing unit 204 comprises the linearizers 301 and the band compensation filters 302, a configuration of the front signal processing unit 204 is not limited to that one. For example, depending on system requirement, the front signal processing unit 204 may further comprise a linear filter such as an FIR (finite impulse response)/IIR (infinite impulse response) filter, a nonlinear filter, a clipping processing unit or the like, in a state of comprising only one of them or more than one of them combined together. Further, the location for arranging the front signal processing unit 204 does not necessarily need to be a stage subsequent to the pre-equalization signal generation unit 202. The front signal processing unit 204 may be arranged at a stage prior to the pre-equalization signal generation unit 202, or at both the prior and subsequent stages.

Here, as examples of the nonlinear characteristics, saturation characteristics of the DACs 206 and of the driver amplifiers 207 are mentioned. Another example to be mentioned is a nonlinear characteristic due to the fact that, in the optical modulator for I-ch 210 or the optical modulator for Q-ch 211, the phase change of an optical signal with respect to the applied drive voltage $V_{mod}$ has a sine wave characteristic. In that case, for example, the phase change of an optical signal is proportional to $\sin(kV_{mod})$ or $\cos(kV_{mod})$ (k is a constant). These nonlinear characteristics do not necessarily need to be ones which occur independently, but, in general, may occur in a mixed manner.

The description of FIG. 2 will be now continued again. The third-prime data and fourth-prime data inputted to the optical modulation unit 205 are converted, respectively, in the DACs 206-1 and 206-2, into analog signals which are respectively proportional to the digital signal amplitude of the third-prime data and that of the fourth-prime data, and then the analog signals are outputted to the driver amplifiers 207-1 and 207-2, respectively. The analog signals inputted to the driver amplifiers 207-1 and 207-2 are amplified to have appropriate electrical signal amplitudes in respective ones of the driver amplifiers 207-1 and 207-2, and then outputted to the MZ type I-Q optical modulator 209 as drive signals.

An optical signal outputted from the light source 208 also is inputted to the MZ type I-Q optical modulator 209.

The MZ type I-Q optical modulator 209 consists of the optical modulator for I-ch 210, the optical modulator for Q-ch 211 and the π/2 phase shifter 212. The optical signal inputted from the light source 208 to the MZ type I-Q optical modulator 209 is split into two optical signals to pass through, respectively, the I-ch optical waveguide and the Q-ch optical waveguide, along the optical waveguides, and one of the two optical signals passes through the optical modulator for I-ch 210, and the other one passes through the optical modulator for Q-ch 211 and the π/2 phase shifter 212.

At that time, on the optical signals passing through the optical modulator for I-ch 210 and the optical modulator for Q-ch 211, optical modulation is performed according to drive signals (electrical signals) inputted from, respectively, the driver amplifiers 207-1 and 207-2. Further, in the π/2 phase shifter 212, the phase of the optical signal having passed through the optical modulator for Q-ch 211 is changed by π/2. Then, the optical signal having passed through the optical modulator for I-ch 210 and that having passed through both the optical modulator for Q-ch 211 and the π/2 phase shifter 212 are combined, and then the combined optical signal is outputted from the MZ type I-Q optical modulator 209 as a transmit signal.

Next, operation of the pre-equalization signal generation unit 202 and of the pre-equalization factor computation unit 203 will be described in detail. An example of a configuration diagram of the pre-equalization signal generation unit 202 and the pre-equalization factor computation unit 203 is shown in FIG. 4, and a diagram for explaining a characteristic of the MZ type I-Q optical modulator 209 in FIG. 5.

Figure 4:
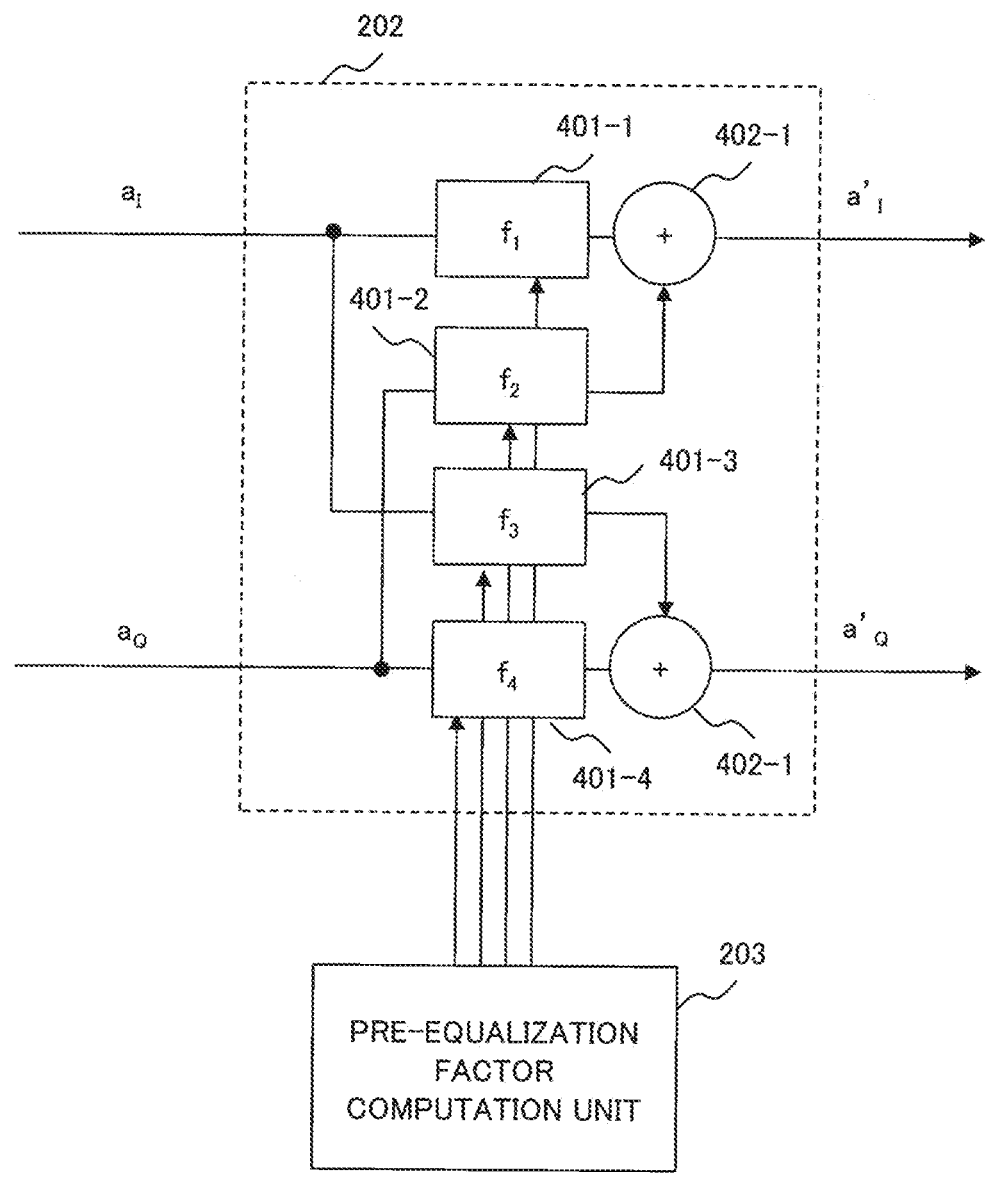

As shown in FIG. 4, the pre-equalization signal generation unit 202 is constituted by a butterfly circuit employing four transform filters 401-1 to 401-4 and two adders 402-1 and 402-2. Filter functions $f_1$ to $f_4$ of respective ones of the transfer filters 401-1 to 401-4 are set on the basis of factor information inputted from the pre-equalization factor computation unit 203. Here, assuming that a data string representing the I-ch signal is denoted by $a_I$ (corresponding to the first data), a data string representing the Q-ch signal by $a_Q$ (the second data), and output data strings from the pre-equalization signal generation unit 202 by $a'_I$ (the third data) and $a'_Q$ (the fourth data), their relations can be described as in an expression (1).

$$\begin{cases} a'_I = f_1(a_I) + f_2(a_Q) \\ a'_Q = f_3(a_I) + f_4(a_Q) \end{cases} \quad \text{expression (1)}$$

In the expression (1), $f_1$ and $f_3$ are described each as a function of $a_I$, and $f_2$ and $f_4$ each as a function of $a_Q$, but each of them is not limited to a function of $a_I$ or $a_Q$, and may be a constant or a function of both $a_I$ and $a_Q$ (f ($a_I$, $a_Q$)). Then, $a'_I$ (the third data) and $a'_Q$ (the fourth data) of the expression (1) are inputted to the front signal processing unit 204.

Figure 5:
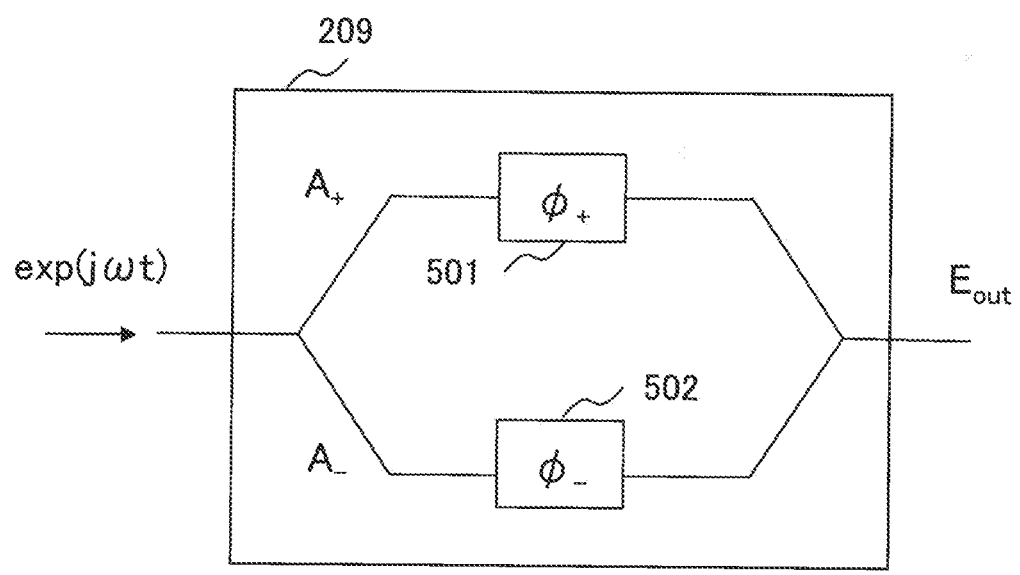

On the other hand, as shown in FIG. 5, an MZ type optical modulator consisting of an upper side phase modulator 501 and a lower side phase modulator 502 may be adopted as the MZ type I-Q optical modulator 209. An optical signal exp(jωt) (j: imaginary unit, ω: optical signal frequency) inputted to the MZ type I-Q optical modulator 209 is split into two optical signals. Of the two optical signals thus split, one passing through the upper side phase modulator 501 has an electric field strength given by $A_+\exp(j\omega t)$, and the other one passing through the lower side phase modulator 502 has that given by $A_-\exp(j\omega t)$.

At that time, the phase rotation amount applied in the upper side phase modulator 501 is given by $\exp(j\pi V/2V_\pi)$, and that applied in the lower side phase modulator 502 by $\exp(-j\pi V/2V_\pi)$. Here, V is a drive voltage to drive the upper side phase modulator 501 and the lower side phase modulator 502, and $V_\pi$ is an applied voltage to make the phase rotation amount equal to π. Optical signals $E_+$ and $E_-$ after the application of phase modulation in, respectively, the upper side phase modulator 501 and the lower side phase modulator 502 are combined together, and the combined signal is outputted from the MZ type I-Q optical modulator 209 as a transmit optical signal $E_{out} = E_+ + E_-$.

Figure 6A:
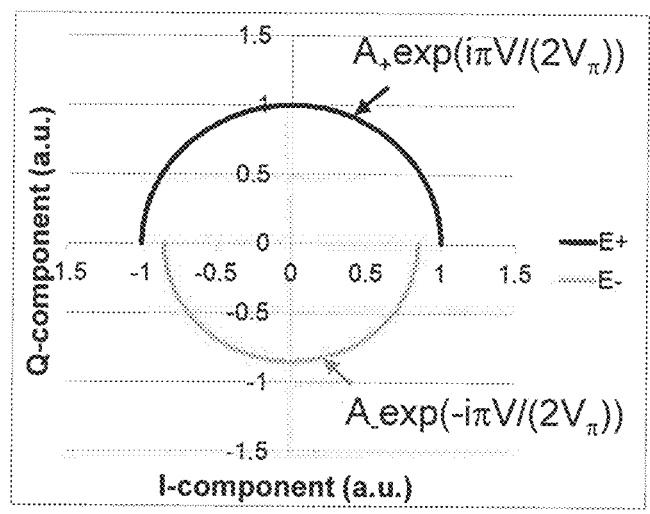

First, a case of $A_+ \neq A_-$ will be described. For a case of $A_+ \neq A_-$, $E_+$ and $E_-$ are shown in FIG. 6A, and $E_{out} = E_+ + E_-$ in FIG. 6B. In FIG. 6A, a black line represents $E_+$, and a gray line does $E_-$.

Figure 6B:
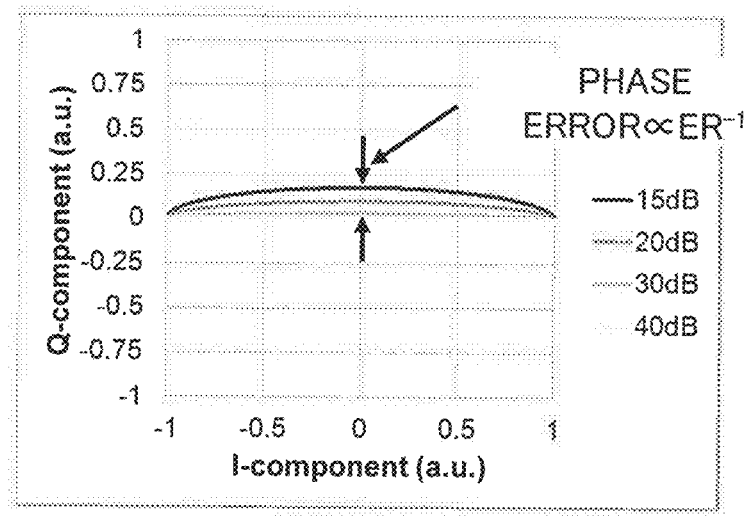

As seen from FIG. 6B, when $A_+ \neq A_-$, there appears a Q component, which is to be cancelled out in the ideal case of $A_+ = A_-$, and a phase error accordingly appears. The phase error has been known to be inversely proportional to the extinction ratio $(ER)=(A_+ + A_-)/(A_+ - A_-)$, from general theoretical calculation.

Figure 7:
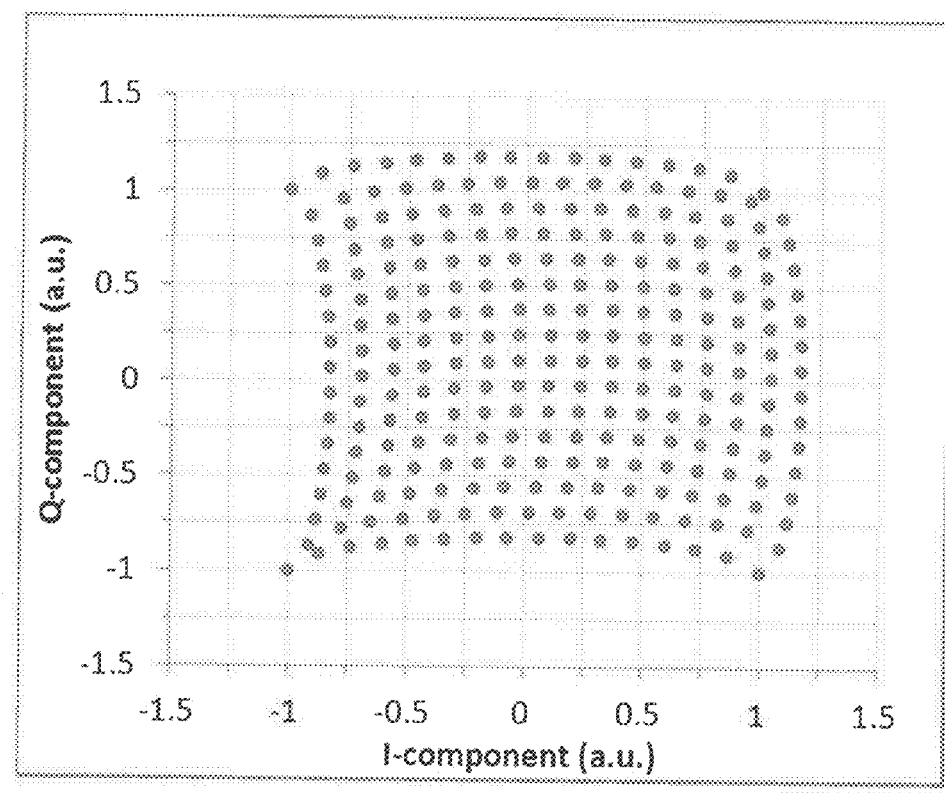

FIG. 7 shows a constellation when a data string with 4-bit accuracy (16 levels) is inputted for each of I and Q, in a case of ER being 15 dB for the upper side phase modulator 501 and the lower side phase modulator 502. As shown in FIG. 7, in a case of ER other than the ideal one (ER=∞), the output waveform from the MZ type I-Q optical modulator 209 is distorted. However, once ER is determined, the waveform distortion is uniquely determined with ER being the parameter.

Figure 8:
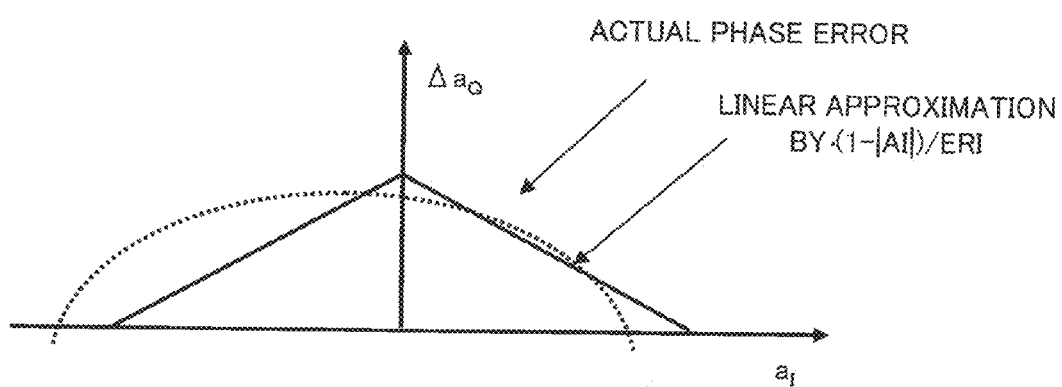

A conceptual diagram of the waveform distortion (corresponding to the phase error in FIG. 6B) is shown in FIG. 8. A dotted line in FIG. 8 illustrates a distortion amount $\Delta a_Q$ of Q-ch data outputted from the optical modulation unit 205 when the I-ch data string $a_I$ is inputted to the pre-equalization signal generation unit 202. In the present exemplary embodiment, linear interpolation is carried out by linearly approximating the phase error. In FIG. 8, $(1-|a_I|/ER_I)$ is used as an approximate expression with respect to $a_I$ and the distortion amount $\Delta a_Q$.

As seen from FIG. 8, the data string $a_4$ and the distortion amount $\Delta a_Q$ are correlated with each other in a one-to-one manner. Therefore, by computing filter functions $f_1$ to $f_4$ to make $\text{A}a_Q$ equal to zero, in the pre-equalization factor computation unit 203, and then setting in advance the computed filter functions $f_1$ to $f_4$ to the transform filters 401-1 to 401-4 of the pre-equalization signal generation unit 202, waveform distortion to occur in the optical modulation unit 205 can be corrected. Here, by performing linear approximation, the correction amount (the filter functions $f_1$ to $f_4$) can be computed without performing complicated computation.

Figure 9:
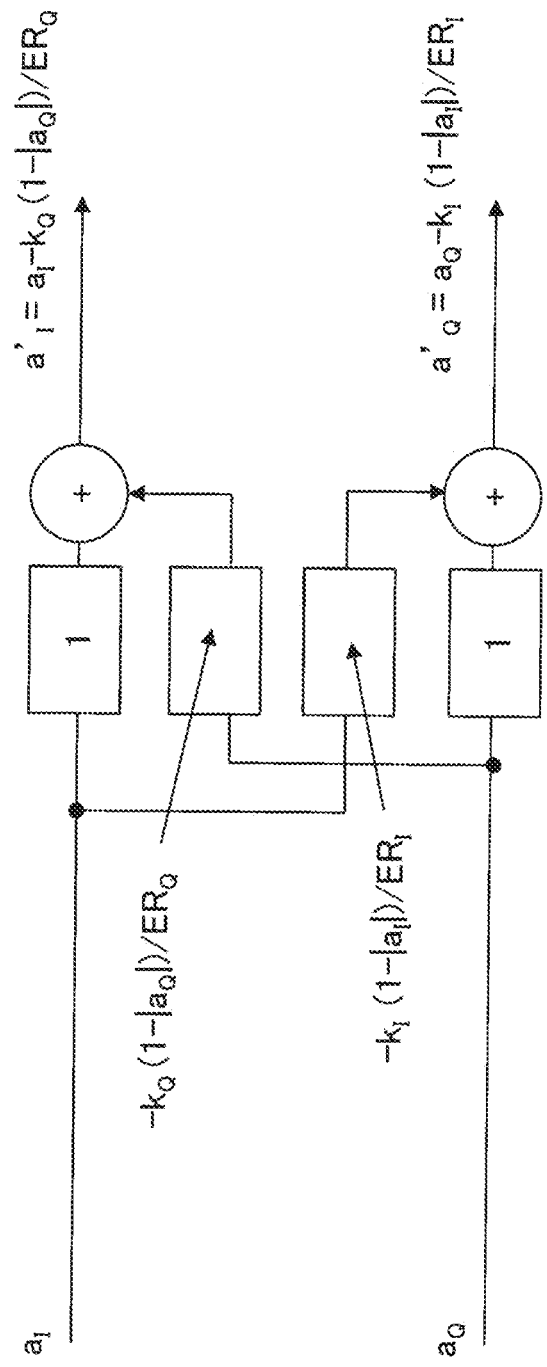

FIG. 9 shows a configuration of the pre-equalization signal generation unit 202 when the linear approximation of FIG. 8 is adopted. As shown in FIG. 9, to the transform filters 401-1 to 401-4 of the pre-equalization signal generation unit 202, filter functions $f_1=1$, $f_2=-k_Q(1-|a_Q|)/ER_Q$, $f_3=-k_I(1-|a_I|)/ER_I$ and $f_4=1$ are set. In this case, by substituting the filter functions into the expression (1) described above, correction signals $a'_I$ (the third data) and $a'_Q$ (the fourth data) are given by an expression (2).

$$\begin{cases} a'_I = a_I - k_Q(1-|a_Q|)/ER_Q \\ a'_Q = a_Q - k_I(1-|a_I|)/ER_I \end{cases} \quad \text{expression (2)}$$

Here, $ER_I$ and $ER_Q$ are extinction ratios of respective ones of the optical modulator for I-ch 210 and the optical modulator for Q-ch 211, which are shown in FIG. 2. Further, $k_I$ and $k_Q$ are adjustment factors for adjusting deviation from an ideal correction due to the linear approximation of FIG. 7 or other device characteristics, which are each adjusted to make the waveform of transmit light preferable.

As seen from the expression (2), $a'_1$ (the third data) is generated by adding $a_Q$ (the second data) in accordance with ER to $a_I$ (the first data), and $a'_Q$ (the fourth data) is generated by adding $a_I$ (the first data) in accordance with ER to $a_Q$ (the second data). Here, while $f_1=1$ and $f_4=1$ are set in FIG. 9, $f_1$ and $f_4$ may be set to be, for example, any proportionality factors $p_1$ and $p_4$, respectively. In that case, the amplitudes of the main signals may be adjusted in proportional to $p_1$ and $p_4$, respectively.

Figure 10A:
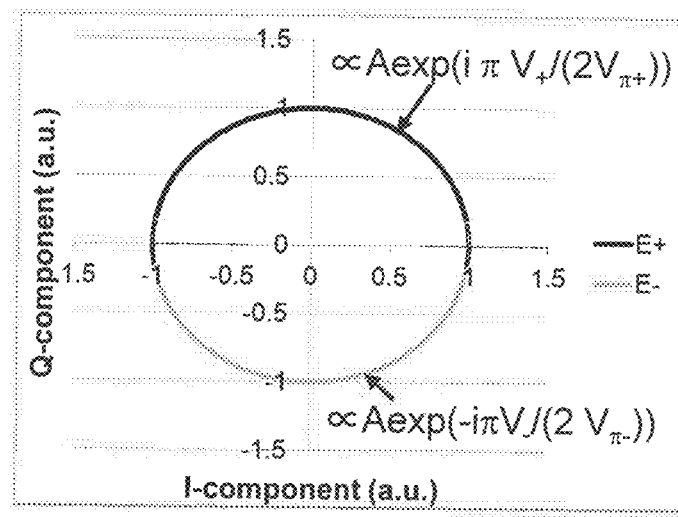
Figure 10B:
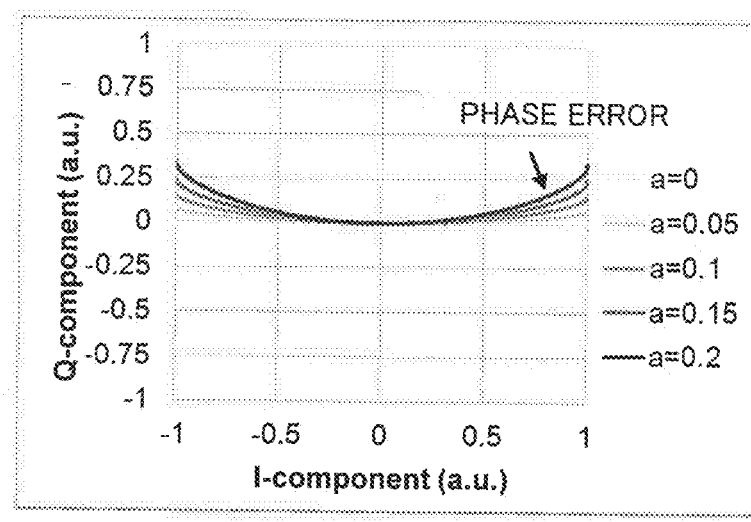

Next, a description will be given of a case of $A_+ = A_-$ where $V_\pi$ of the upper side phase modulator 501 and that of the lower side phase modulator 502 are $V_{\pi+}$ and $V_{\pi-}$, respectively, as a result of the difference in refractive index between the optical waveguides. FIG. 10A shows $E_+$ and $E_-$ in the case of $V_{\pi+} \neq V_{\pi-}$, where the black line represents $E_+$, and the gray line does $E^-$. FIG. 10B shows $E_{out}=E_+ + E_-$ in the case of $V_{\pi+} \neq V_{\pi-}$. As seen from FIG. 10B, in the case of $V_{\pi+} \neq V_{\pi-}$, there appears a Q component, which is to be cancelled out in the ideal case of $V_{\pi+} \neq V_{\pi-}$, and a phase error accordingly appears. The phase error has been known to be proportional to $\alpha=(V_{90+}-V_{\pi-})/(V_{\pi+}+V_{\pi-})=\Delta V_\pi/V_\pi$ (hereafter, referred to as an a parameter), from general theoretical calculation.

Figure 11:
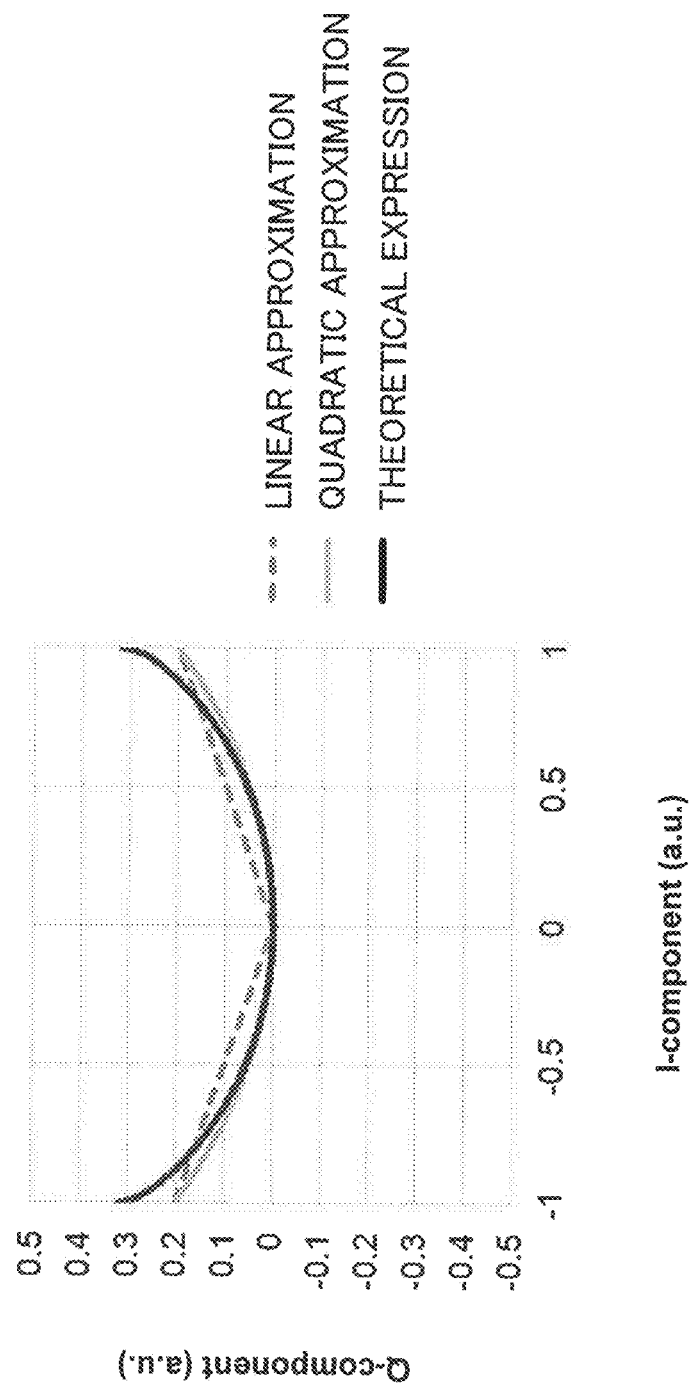

However, once a is determined, the waveform distortion is uniquely determined with a being the parameter. FIG. 11 is a diagram where, as an example, a theoretical curve (the solid line in the diagram) of waveform distortion for $\alpha=0.2$ is approximated by a linear curve (the dotted line in the diagram) and by a quadratic curve (the gray line in the diagram). As seen from FIG. 11, the waveform distortion can be approximated by simple linear or quadratic calculation. Therefore, by computing filter functions $f_1$ to $f_4$ to make $\Delta a_Q$ equal to zero, in the pre-equalization factor computation unit 203, and then setting the computed filter functions $f_1$ to $f_4$ to the transform filters 401-1 to 401-4 of the pre-equalization signal generation unit 202, the waveform distortion to occur in the optical modulation unit 205 can be corrected.

Figure 12:
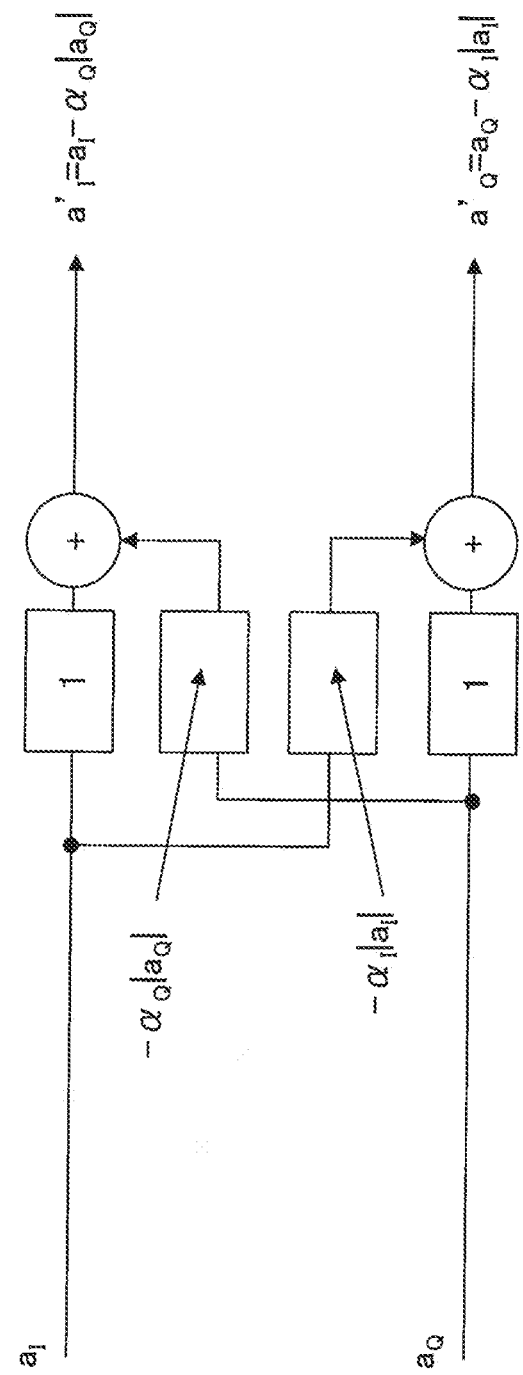

FIG. 12 shows a configuration of the pre-equalization signal generation unit 202 when the linear approximation (dotted line) of FIG. 11 is adopted. As shown in FIG. 12, to the transform filters 401-1 to 401-4 of the pre-equalization signal generation unit 202, the filter functions $f_1=1$, $f_2=-\alpha_Q|a_Q|$, $f_3=-\alpha_I|a_I|$ and $f_4=1$ are set. In this case, by substituting the filter functions into the expression (1) described above, correction signals $a'_I$ (the third data) and $a'_Q$ (the fourth data) are given by an expression (3).

$$\begin{cases} a'_I = a_I - \alpha_Q|a_Q| \\ a'_Q = a_Q - \alpha_I|a_I| \end{cases} \quad \text{expression (3)}$$

Here, $\alpha_I$ and $\alpha_Q$ are $\alpha$ values for respective ones of the optical modulator for I-ch 210 and the optical modulator for Q-ch 211, which are shown in FIG. 2.

Figure 13A:
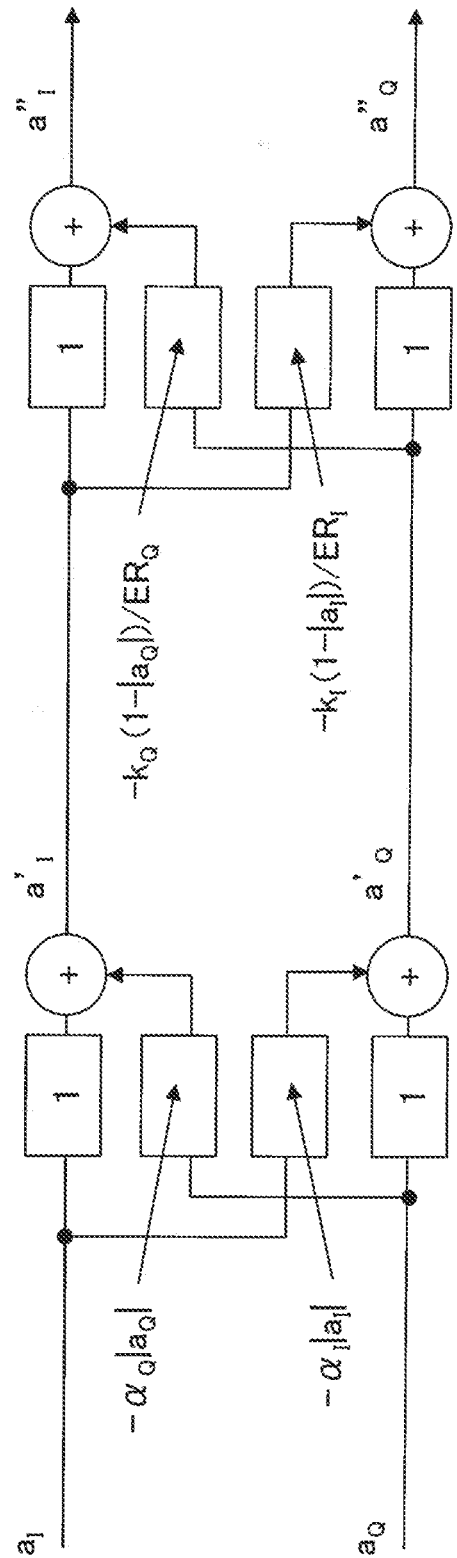

FIG. 13A shows a configuration of the pre-equalization signal generation unit 202 in which the pre-equalization signal generation of FIG. 9 and that of FIG. 12 are sequentially performed. In FIG. 13A, inputted data strings $a_I$ and $a_Q$ receive waveform distortion compensation by the use of $\alpha$, which is equivalent to that of FIG. 12, thus being outputted as $a'_I$ and $a'_Q$, and subsequently receive waveform distortion compensation by the use of extinction ratio deterioration, which is equivalent to FIG. 9, thus being outputted as $a''_I$ and $a''_Q$, respectively. In this case, the relation of $a_I$ and $a_Q$ with $a''_I$ and $a''_Q$ is given by an expression (4), as a result of substituting the expression (2) into the expression (3), making approximation considering that $1/ER_I$, $1/ER_Q$, $\alpha_I$ and $\alpha_{IQ}$ are sufficiently small values, and thus acquiring combined expressions.

$$\begin{cases} a''_I \approx a_I - k_Q/ER_Q - (\alpha_Q - k_Q/ER_Q)|a_Q| \\ a''_Q \approx a_Q - k_I/ER_I - (\alpha_I - k_I/ER_I)|a_I| \end{cases} \quad \text{expression (4)}$$

Figure 13B:
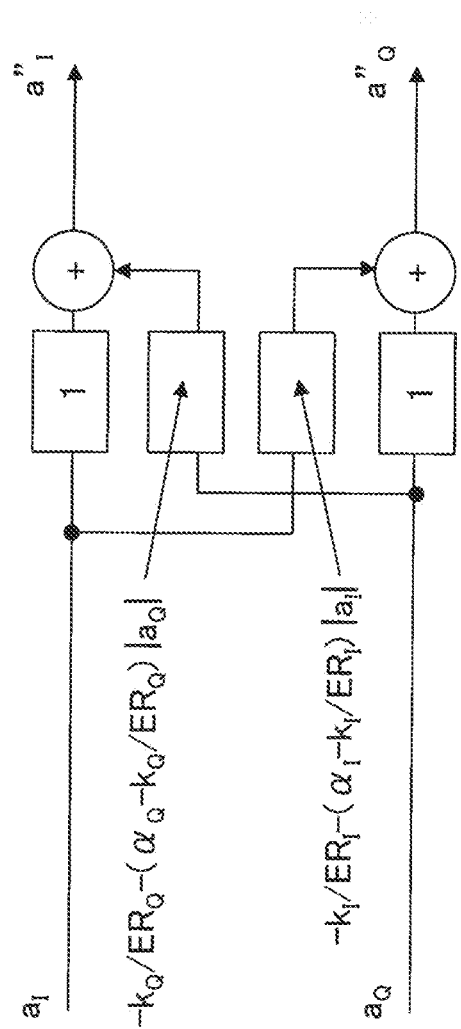

Accordingly, as a configuration to realize the pre-equalization of the equation (4), factors of the filter functions may be set as $f_1=1$, $f_2=-k_Q/ER_Q-(\alpha_Q-k_Q/ER_Q)|a_Q|$, $f_3=-k_I/ER_I-(\alpha_I-k_I/ER_I)|a_I|$ and $f_4=1$. Thus set configuration of the pre-equalization signal generation unit 202 is shown in FIG. 13B.

Here, approximation of combined expressions is not limited to that used in the expression (4). The factors of the filter functions to be set may be modified depending on the parameters such as $1/ER_I$, $1/ER_Q$, $\alpha_I$ and $\alpha_{IQ}$, in a manner to make a transmit waveform preferable.

While FIGS. 9, 12 and 13 show examples of configurations based on linear approximation, it is desirable to adopt higher degree approximation (for example, the gray line in FIG. 11) if the accuracy of approximation needs to be increased. However, high degree approximation leads to increase in a circuit scale required for the computation. Improvement in performance and increase in circuit scale are thus in a trade-off relation, and accordingly, it is desirable to perform approximation in accordance with required performance necessary for an entire system.

(modified example of second exemplary embodiment)

A modified example of the second exemplary embodiment will be described below. In the present example, a description will be given below of a case where linear approximation such as shown in FIG. 8 (the solid line) or FIG. 11 (the dotted line), in the second exemplary embodiment, cannot be applied to waveform distortion to occur in the optical modulation unit 205.

Figure 14:
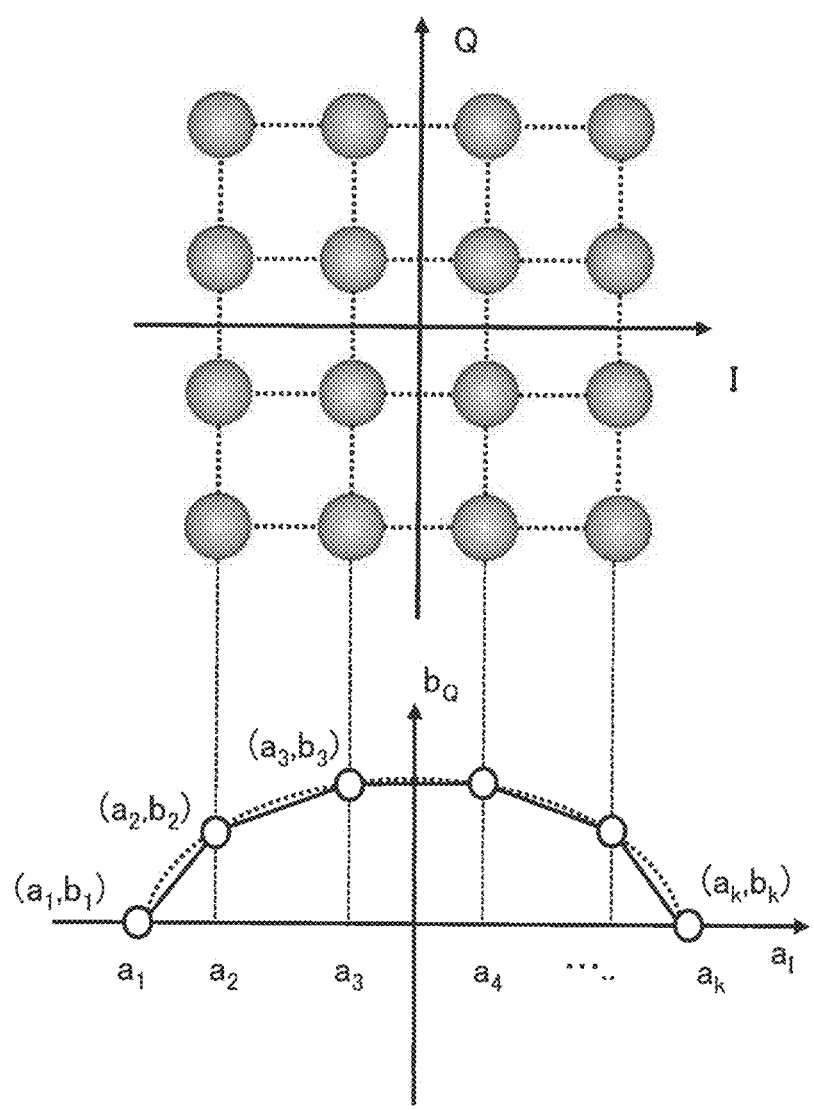

An example of waveform distortion to which linear approximation cannot be applied is shown by a dotted line in FIG. 14. In FIG. 14, $a_I$ to $a_k$ are coordinates representing respective ones of segments into which the range the first data (data string $a_I$) can take is divided, and $b_I$ to $b_k$ are waveform distortions at the respective coordinates.

In FIG. 14, at an intermediate coordinate within each of the segments, a corresponding compensation amount can be determined by linear interpolation. That is, the compensation amount at a data input value $a_I+\Delta n(a_m-a_I)$ which internally divides a segment from $(a_I, b_I)$ to $(a_m, b_m)$ (1<m) by a ratio $\Delta n:1-\Delta n$ is given by $b_I+\Delta n(b_m-b_I)$.

A compensation amount $d_I$ for the second data (data string $c_Q$) also can be determined by employing a similar method. That is, when coordinates representing respective ones of segments into which the value range $c_Q$ can take is divided are assumed to be $c_1$ to $c_j$, and waveform distortions at the respective coordinates are $d_1$ to $d_j$, the compensation amount at a data input value $c_p+\Delta r(c_q-c_p)$ which internally divides a segment from $(c_p, d_p)$ to $(c_q, d_q)$ (p<q) by a ratio $\Delta r:1-\Delta r$ is given by $d_p+\Delta r(d_q-d_p)$.

Accordingly, the filter functions when the data string $a_I$ representing the first data and the data string $c_Q$ representing the second data are inputted are set as $f_1=1$, $f_2=-d_p-\Delta r(d_q-d_p)$, $f_3=-a_I-\Delta n(a_m-a_I)$ and $f_4=1$, respectively.

In that case, in the pre-equalization factor computation unit 203, the filter functions $f_1$ to $f_4$ are determined with respect to any $a_4$ or $c_Q$ by computation, on the basis of information on $(a_I, b_I)$ to $(a_k, b_k)$ and on $(c_I, d_I)$ to $(c_j, d_j)$ which are set in advance at respective boundaries between the segments.

In the method of computing pre-equalization factors shown in FIG. 14, there occurs an error in each of distortion compensation amounts for other than the segment boundaries, with reference to an ideal one, owing to the fact that the distortion compensation amounts are obtained by computation using linear interpolation. However, even in such situation, in cases such as of using QAM signals shown in the upper region of FIG. 14 (a case of 16-QAM is illustrated in FIG. 14), by making the coordinate locations coincide with the respective boundaries of segmentation, an error at each of the locations at which signals are present can be reduced, and as a result, distortion compensation can be performed with higher accuracy.

Figure 15:
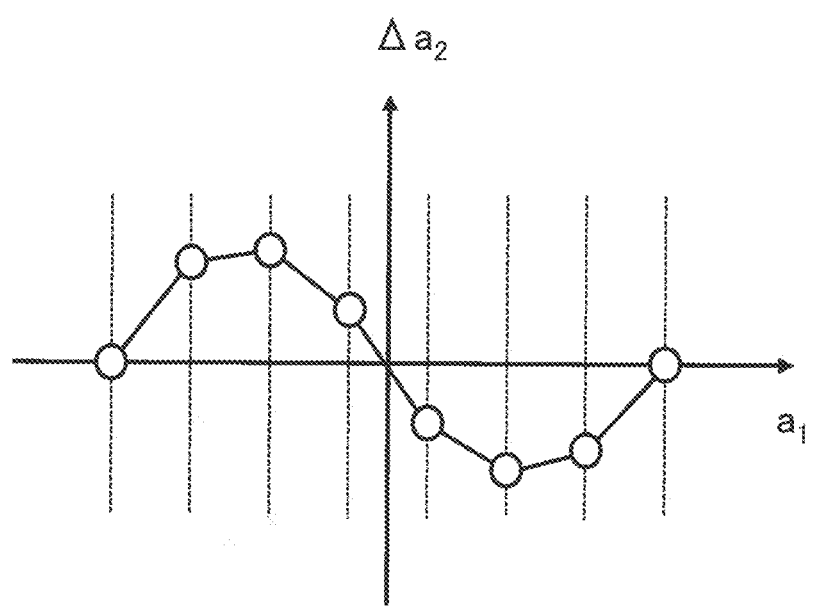

FIG. 15 shows an example of segmentation in a case where waveform distortion with an arbitrary shape occurs. By determining the compensation amounts by linear interpolation after performing segmentation, it is possible, even when various kinds of waveform distortion due to device characteristics or physical properties of the optical modulators or the driver amplifiers occur, to compute the waveform distortion compensation amounts with high accuracy.

(third exemplary embodiment)

Figure 16:
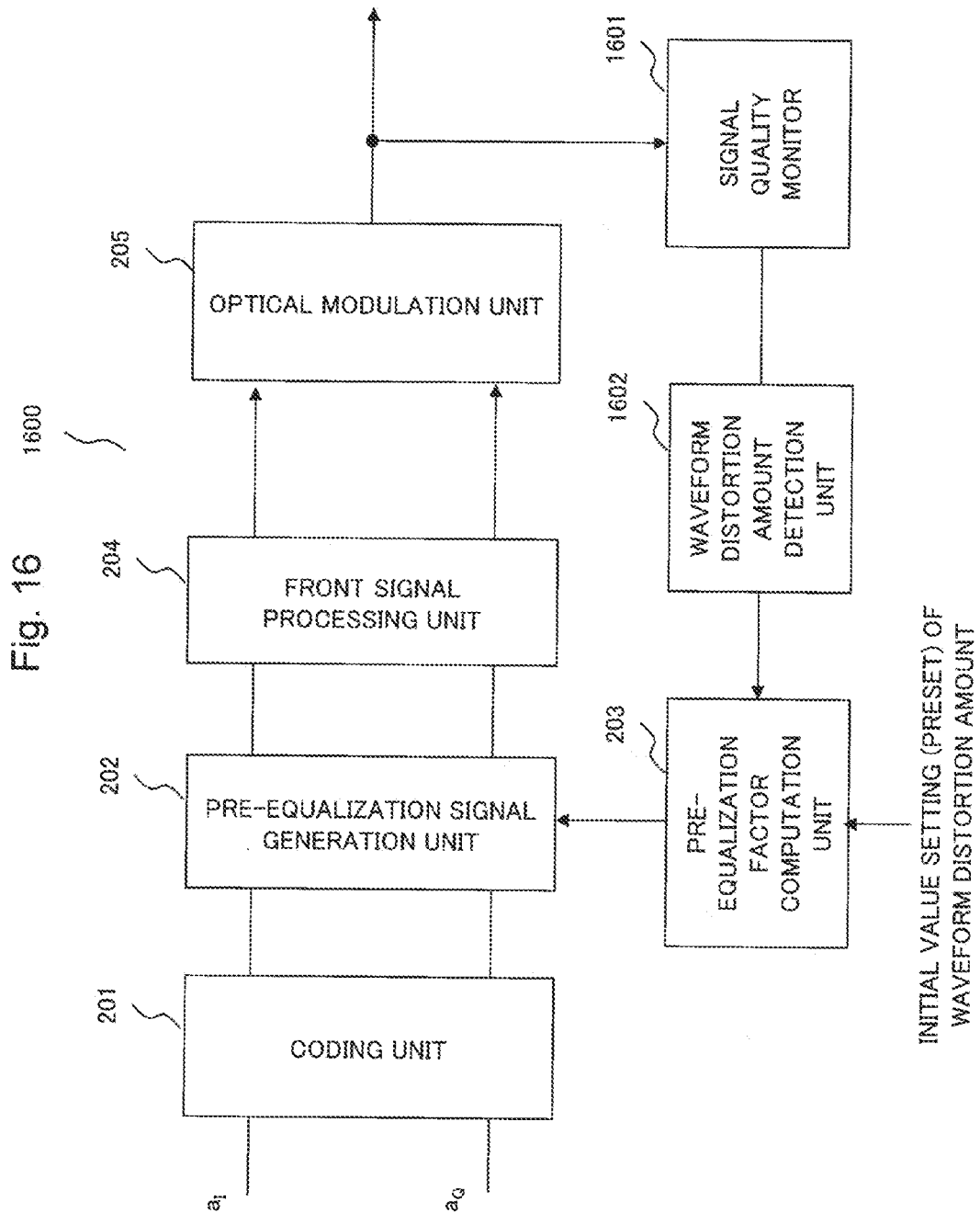

A third exemplary embodiment will be described below. FIG. 16 shows a block configuration diagram of an optical transmitter/receiver according to the present exemplary embodiment. A digital optical transmitter 1600 according to the present exemplary embodiment comprises a signal quality monitor 1601 and a waveform distortion amount detection unit 1602, in addition to the digital optical transmitter 200 according to the second exemplary embodiment shown in FIG. 2. Here, to any component which is the same as that of the digital optical transmitter 200 of FIG. 2, the same sign as that used in FIG. 2 is assigned, and its description is omitted.

The signal quality monitor 1601 monitors transmit signals from the optical modulation unit 205. As the signal quality monitor 1601, a preferable monitoring method may be selected, depending on the transmit signals and the type of distortion to occur, from among a waveform monitor, a spectrum monitor, an error rate monitor, a constellation monitor, a power monitor and the like.

The waveform distortion detection unit 1602 detects a waveform distortion amount on the basis of a monitor signal from the signal quality monitor 1601, and outputs the detected waveform distortion amount to the pre-equalization factor computation unit 203.

In the digital optical transmitter 1600 configured as above, even when temporally fluctuating waveform distortion is imposed to the transmit signal, pre-equalization by the pre-equalization signal generation unit 202 can be adaptively performed. Accordingly, high-quality transmit signals can be transmitted constantly.

Here, it is not necessarily required to set the waveform distortion amount from the waveform distortion amount detection unit 1602 to the pre-equalization factor computation unit 203 in a feedback-like manner. The set value of the pre-equalization factor computation unit 203 may be set in advance at an initial value of the waveform distortion amount in a preset-like manner, and may be updated when a certain magnitude of waveform distortion has occurred as a result of long term variation due to aging or the like. In the present case, the signal quality of transmit signals can be maintained in a simple manner without performing complicated control.

(fourth exemplary embodiment)

Figure 17:
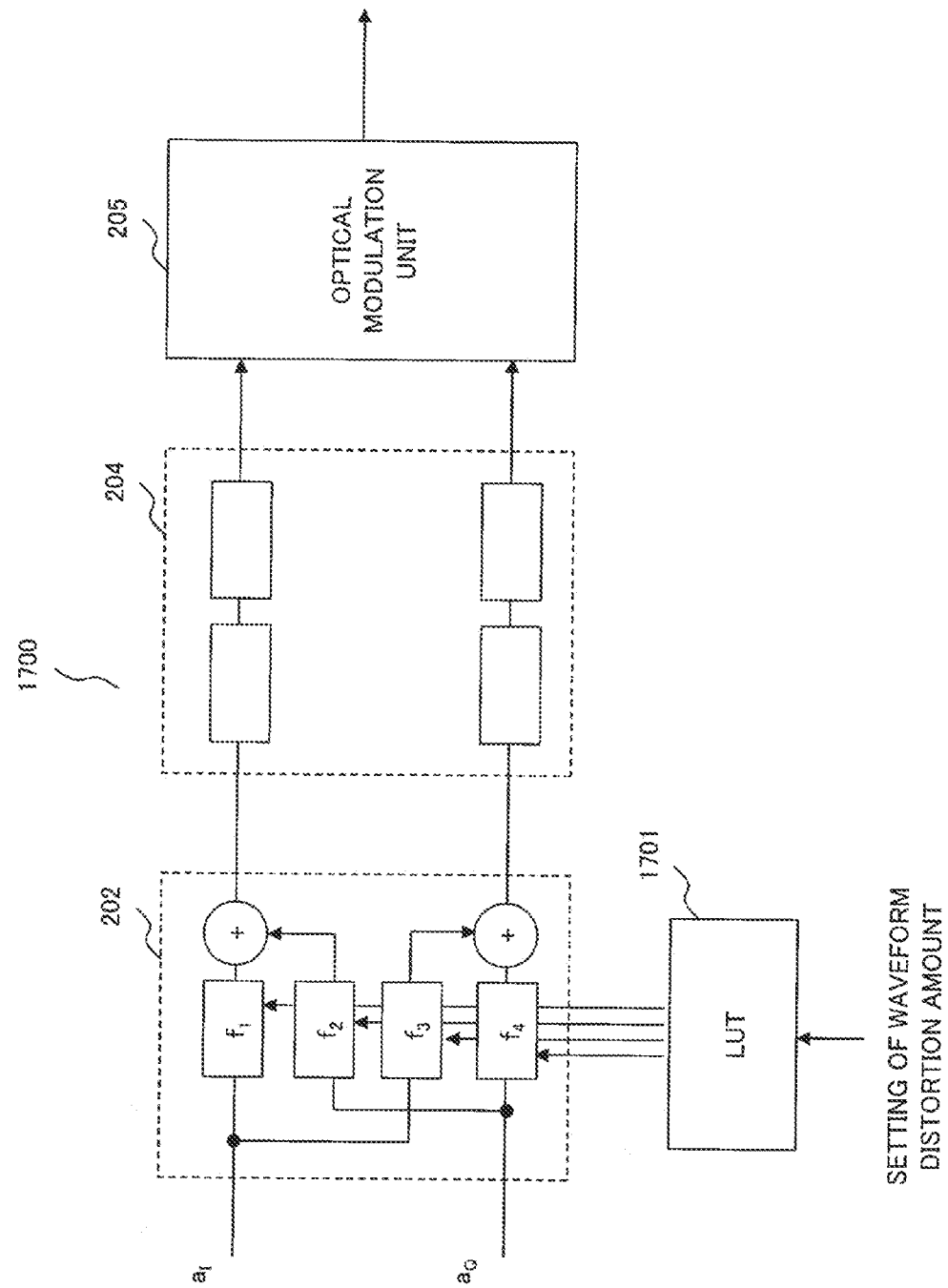

A fourth exemplary embodiment will be described below. FIG. 17 shows a block configuration diagram of an optical transmitter/receiver according to the present exemplary embodiment. A digital optical transmitter 1700 in FIG. 17 is one obtained by arranging an LUT (lookup table) 1701 into the digital optical transmitter 200 of FIG. 2, in place of the pre-equalization factor computation unit 200. Here, to any component which is the same as that of the digital optical transmitter 200 of FIG. 2, the same sign as that used in FIG. 2 is assigned, and its description is omitted.

In FIG. 17, filter functions $f_1$ to $f_4$ of the transform filters 401-1 to 401-4 are registered into the LUT 1701 with respect to each of various types of waveform distortion amounts. The LUT 1701 extracts optimum filter functions $f_1$ to $f_4$ corresponding to waveform distortion imposed in the optical modulation unit 205 and outputs them to the pre-equalization signal generation unit 202.

By comprising the LUT 1701, the digital optical transmitter 1700 can set filter functions $f_1$ to $f_4$ of the pre-equalization signal generation unit 202 without computing pre-equalization factors. Accordingly, the digital optical transmitter 1700 according to the present exemplary embodiment can perform high-speed control with a simpler configuration, and also can suppress increase in circuit scale and in power consumption.

(fifth exemplary embodiment)

Figure 18:
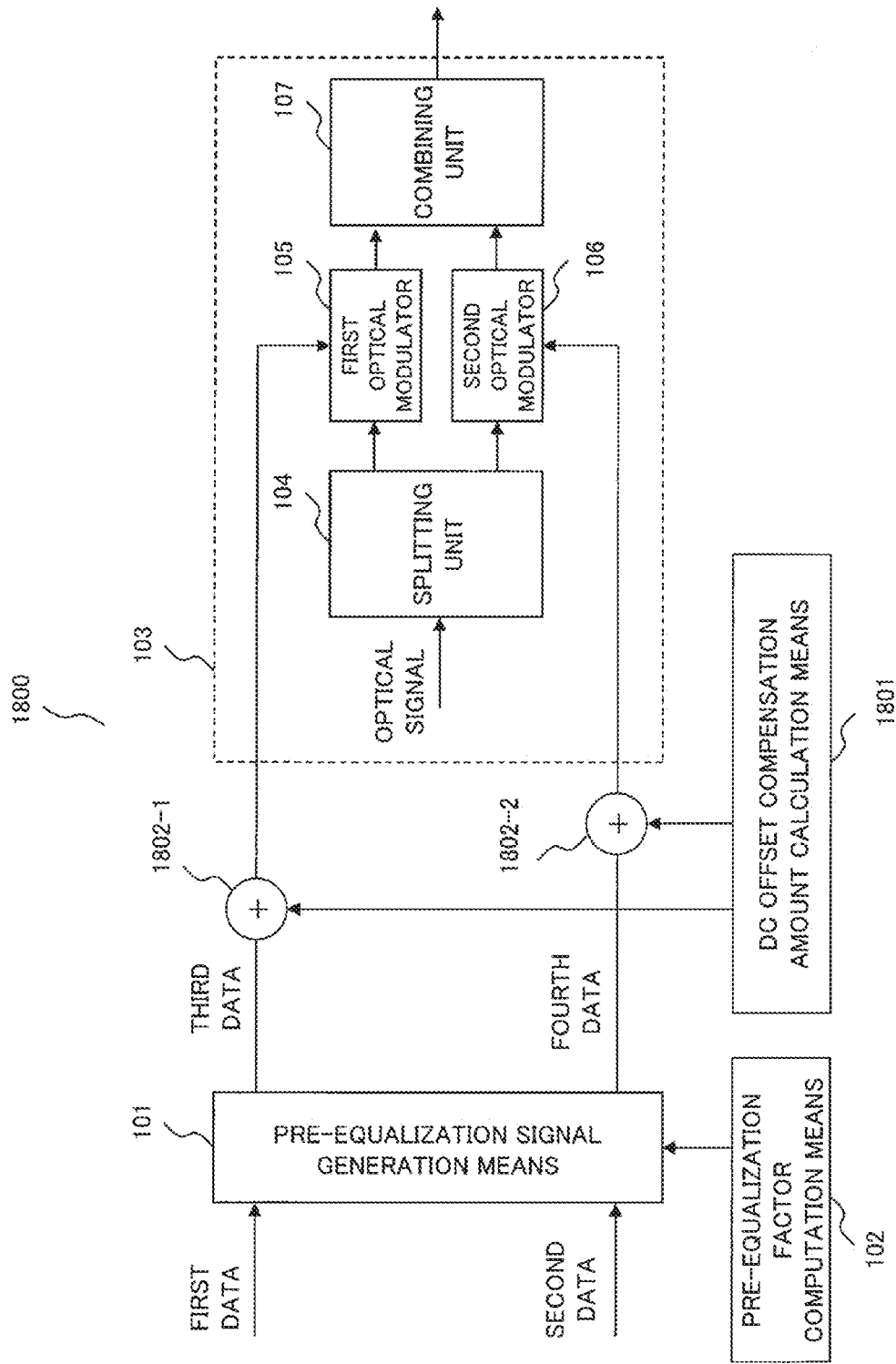
Figure 19:
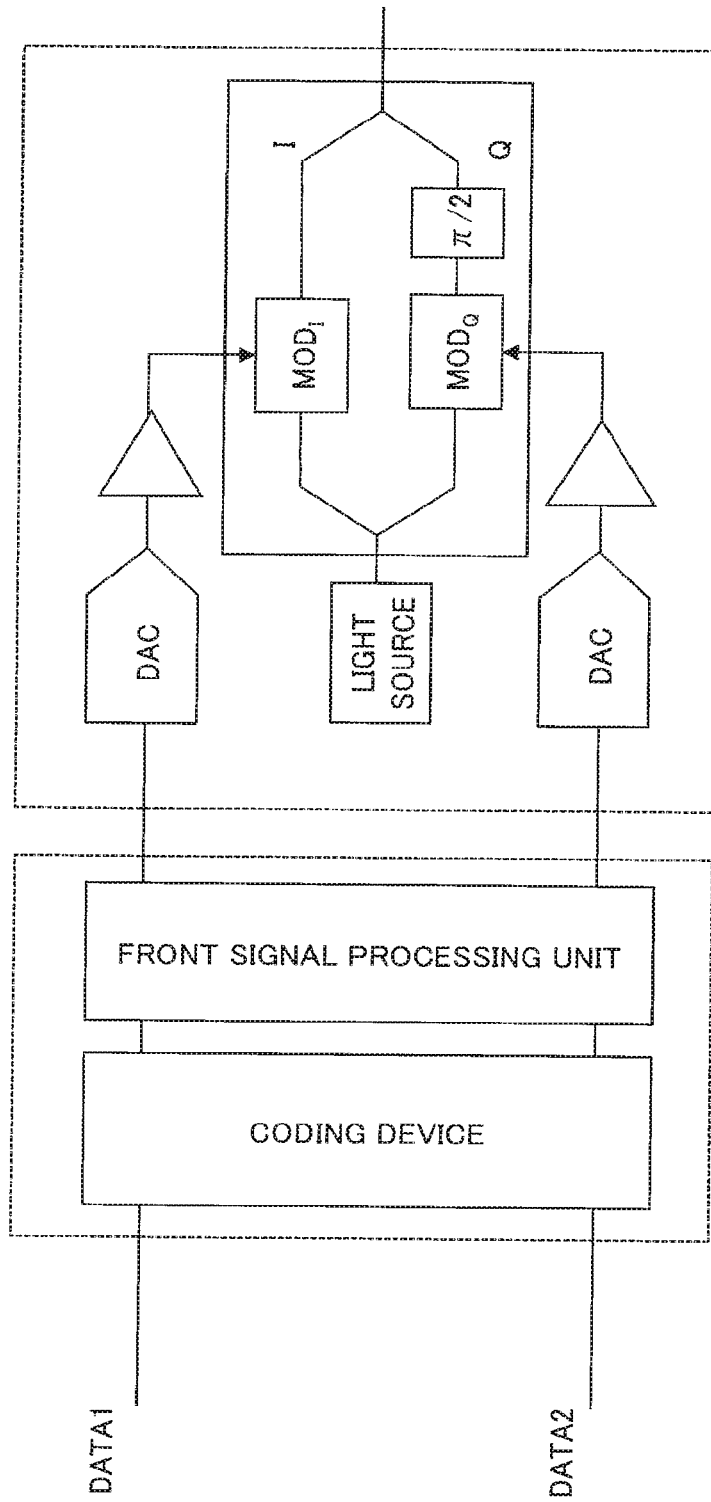

A fifth exemplary embodiment will be described below. FIG. 18 shows a block configuration diagram of an optical transmitter/receiver according to the present exemplary embodiment. A digital optical transmitter 1800 according to the present exemplary embodiment comprises a direct current (DC) offset compensation amount calculation means 1801 and adders 1802, in addition to the digital optical transmitter 100 according to the first exemplary embodiment shown in FIG. 1. Here, to any component which is the same as that of the digital optical transmitter 100 of FIG. 1, the same sign as that used in FIG. 1 is assigned, and its description is omitted.

The DC offset compensation amount calculation means 1801 according to the present exemplary embodiment calculates DC offset amounts to be added to, respectively, the third data and the fourth data, and then outputs the amounts to, respectively, the adder 1802-1 and the adder 1802-2, thereby adjusting DC offset amounts of the third data and of the fourth data. At that time, the DC offset amount to be added to the third data is calculated in accordance with waveform distortion to occur in the second optical modulator, and the DC offset amount to be added to the fourth data is calculated in accordance with waveform distortion to occur in the first optical modulator. In the present case, waveform distortion compensation can be performed with higher accuracy in a simple manner.

As has been described above, even when pre-equalization signals using multi-level modulated signals such as of QAM or that using a complicated transmit waveform are employed, the digital optical transmitter according to each of the above-described exemplary embodiments can correct waveform distortion due to imperfection in an interferometer constituting an MZ type optical modulator used there, or the like, by the use of pre-equalization signals provided by a DSP, and accordingly can suppress deterioration in the communication quality.

Further, because the performance required of the optical modulator and the analog front end devices can be relaxed, it becomes possible to improve the yield of components to be used, and accordingly to provide a low-cost digital optical transmitter.

The present invention is not limited to the above-described exemplary embodiments, and any modification in design within a range not departing from the spirit of the present invention should be embraced in the present invention. The present invention is based upon and claims the benefit of priority from Japanese Patent Application No. 2013-078448, filed on April 4, 2013, the disclosure of which is incorporated herein in its entirety by reference.

INDUSTRIAL APPLICABILITY

The present invention can be applied not only to core and metro communication networks but to all communication networks using light.

REFERENCE SIGNS LIST

100, 200, 1600, 1700, 1800 digital optical transmitter
101 pre-equalization signal generation means
102 pre-equalization factor computation means
103 optical modulator
104 splitting unit
105 first optical modulator
106 second optical modulator
107 combining unit
201 coding unit
202 pre-equalization signal generation unit
203 pre-equalization factor computation unit
204 front signal processing unit
205 optical modulation unit
206 DAC
207 driver amplifier
208 light source
209 MZ type I-Q optical modulator
210 optical modulator for I-ch
211 optical modulator for Q-ch
212 $\pi/2$ phase shifter
301 linearizer
302 band compensation filter
401 transform filter
402 adder
501 upper side phase modulator
502 lower side phase modulator
1601 signal quality monitor
1602 waveform distortion amount detection unit
1701 LUT
1801 DC offset compensation amount calculation means
1802 adder

The invention claimed is:

1. A digital optical transmitter comprising:
a pre-equalization factor computation circuit which generates transform functions defined by transform factors;
a pre-equalization signal generator which generates third data and fourth data from first data and second data, by the use of the generated transform functions; and
an optical modulator comprising a signal splitter for splitting an optical signal into two, a first optical modulator for performing optical modulation of one of the split optical signals on the basis of the third data, a second optical modulator for performing optical modulation of the other one of the split optical signals on the basis of the fourth data, and a signal combiner for combining the two optical signals having received the optical modulations and outputting the combined optical signal,
wherein the transform functions are functions for transforming, respectively, the first data to the fourth data using a characteristic of the optical modulator and the second data, and the second data to the third data using a characteristic of the optical modulator and the first data, in a manner to compensate waveform distortion to occur in the optical modulator.

2. The digital optical transmitter according to claim 1, wherein the transform functions are functions for generating the third data by adding the second data to the first data, in a manner depending on the extinction ratio and applied voltage of the optical modulator, and for generating the fourth data by adding the first data to the second data, in a manner depending on the extinction ratio and applied voltage of the optical modulator.

3. The digital optical transmitter according to claim 1, wherein the pre-equalization factor computation circuit generates the transform factors for compensating waveform distortion to occur in the optical modulator by linear interpolation.

4. The digital optical transmitter according to claim 3, wherein the linear interpolation is performed with respect to each of segment blocks created by segmentation.

5. The digital optical transmitter according to claim 1, wherein:

the optical modulator is a MZ type optical modulator;
the pre-equalization signal generator comprises a butterfly circuit employing a plurality of transform filters and adders; and
the pre-equalization signal generator generates filter functions of the transform filters, as the transform functions.

6. The digital optical transmitter according to claim 1, further comprising a signal quality monitor which extracts waveform distortion from signals outputted from the optical modulator, wherein the pre-equalization factor computation circuit generates the transform functions on the basis of the extracted waveform distortion.

7. The digital optical transmitter according to claim 1, further comprising a table in which a plurality of waveform distortions and transform functions are registered in a manner to be correlated with each other, wherein the pre-equalization factor computation circuit generates the transform functions by extracting them from the table.

8. The digital optical transmitter according to claim 1, further comprising a front signal processing unit which performs, on the third data and fourth data, a process of linearizing nonlinear characteristics of front-end devices and a process of correcting their frequency characteristics.

9. The digital optical transmitter according to claim 1, further comprising a DC offset compensation amount calculation unit which calculates DC offset compensation amounts for compensating waveform distortion to occur in the optical modulator, and adds the DC offset compensation amounts that are calculated to the third data and fourth data.

10. An optical communication system employing the digital optical transmitter according to claim 1.

11. A digital optical transmission method using an optical modulator comprising a signal splitter for splitting an optical signal into two, a first optical modulator for performing optical modulation of one of the split optical signals on the basis of third data, a second optical modulator for performing optical modulation of the other one of the split optical signals on the basis of fourth data, and a signal combiner for combining the two optical signals having received the optical modulations and outputting the combined optical signal, generating transform functions defined by transform factors for compensating signal distortion to occur in the optical modulator, and generating the third data and the fourth data from first data and second data, by the use of the generated transform functions, wherein the transform functions are functions for transforming, respectively, the first data to the fourth data using a characteristic of the optical modulator and the second data, and the second data to the third data using a characteristic of the optical modulator and the first data, in a manner to compensate waveform distortion to occur in the optical modulator.

12. A digital optical transmitter comprising:

pre-equalization factor computation means for generating transform functions defined by transform factors;

pre-equalization signal generation means for generating third data and fourth data from first data and second data, by the use of the generated transform functions; and an optical modulator comprising a splitting unit for splitting an optical signal into two, a first optical modulation unit for performing optical modulation of one of the split optical signals on the basis of the third data, a second optical modulation unit for performing optical modulation of the other one of the split optical signals on the basis of the fourth data, and a combining unit for combining the two optical signals having received the optical modulations and outputting the combined optical signal, wherein the transform functions are functions for transforming, respectively, the first data to the fourth data using a characteristic of the optical modulator and the second data, and the second data to the third data using a characteristic of the optical modulator and the first data, in a manner to compensate waveform distortion to occur in the optical modulator.

* * * * *